United States Patent [19]

Garrison

[11] Patent Number: 5,027,656

[45] Date of Patent: Jul. 2, 1991

[54] FUEL GAUGE DAMPER CIRCUIT WITH A RETURN TO ZERO GAUGE CIRCUIT

[75] Inventor: James R. Garrison, Hazelgreen, Ala.

[73] Assignee: Acustar, Inc., Troy, Mich.

[21] Appl. No.: 563,222

[22] Filed: Aug. 6, 1990

Related U.S. Application Data

[63] Continuation-in-part of Ser. No. 364,914, Jun. 12, 1989, abandoned, which is a continuation of Ser. No. 144,217, Jan. 15, 1988, Pat. No. 4,838,082.

[51] Int. Cl.$^5$ .................. G01F 23/22; G01F 23/30; G01F 23/36
[52] U.S. Cl. .................................. 73/313; 73/113; 330/253; 324/154 R; 324/76 R
[58] Field of Search ............... 73/313, 113; 330/253, 330/255, 277, 293, 300; 324/125, 157, 154 R, 76 R; 307/10.1, 10.6

[56] References Cited

U.S. PATENT DOCUMENTS

| | | | |
|---|---|---|---|
| 2,356,617 | 8/1944 | Rich | 171/95 |
| 3,638,115 | 1/1972 | Grundy | 324/125 |
| 3,649,911 | 3/1972 | Swanson | 324/125 |
| 3,727,182 | 4/1973 | Snyder | 340/59 |
| 3,761,731 | 9/1973 | Burgett et al. | 307/10.6 |
| 3,855,532 | 12/1974 | Woodward | 324/154 R |
| 3,938,117 | 2/1976 | Bozoian | 340/244 |
| 4,194,165 | 3/1980 | Skulski | 330/255 |
| 4,250,750 | 2/1981 | Martinec et al. | 73/308 |
| 4,291,268 | 9/1981 | Okuyama | 324/154 R |
| 4,402,048 | 8/1983 | Tsuchida et al. | 364/442 |
| 4,470,296 | 9/1984 | Kobayashi et al. | 73/313 |
| 4,497,205 | 2/1985 | Zulauf et al. | 73/313 |
| 4,542,348 | 9/1985 | Lucas et al. | 330/255 |
| 4,553,093 | 11/1985 | Chikasue | 324/154 R |
| 4,760,736 | 8/1988 | Huynh | 73/313 |
| 4,838,082 | 6/1989 | McCoy et al. | 73/313 |

Primary Examiner—William A. Cuchlinski, Jr.
Assistant Examiner—Diego F. F. Gutierrez
Attorney, Agent, or Firm—Mark P. Calcaterra

[57] ABSTRACT

A fuel gauge damper circuit takes a variable resistance signal from a fuel tank sending unit, develops an input voltage proportional to the variable resistance and generates a filtered average of the input voltage at the fuel gauge damper output. The circuit damps undesirable large swings in the input voltage caused by "sloshing" in the fuel tank. Additionally, the damper circuit features power-up initialization apparatus for eliminating erroneous gauge indications which would otherwise occur upon the initiation of vehicle engine cranking. Also, a return to zero circuit is provided which drives the fuel gauge to zero after the engine is turned off in order to begin the gauge operation from zero when the engine is turned on.

2 Claims, 3 Drawing Sheets

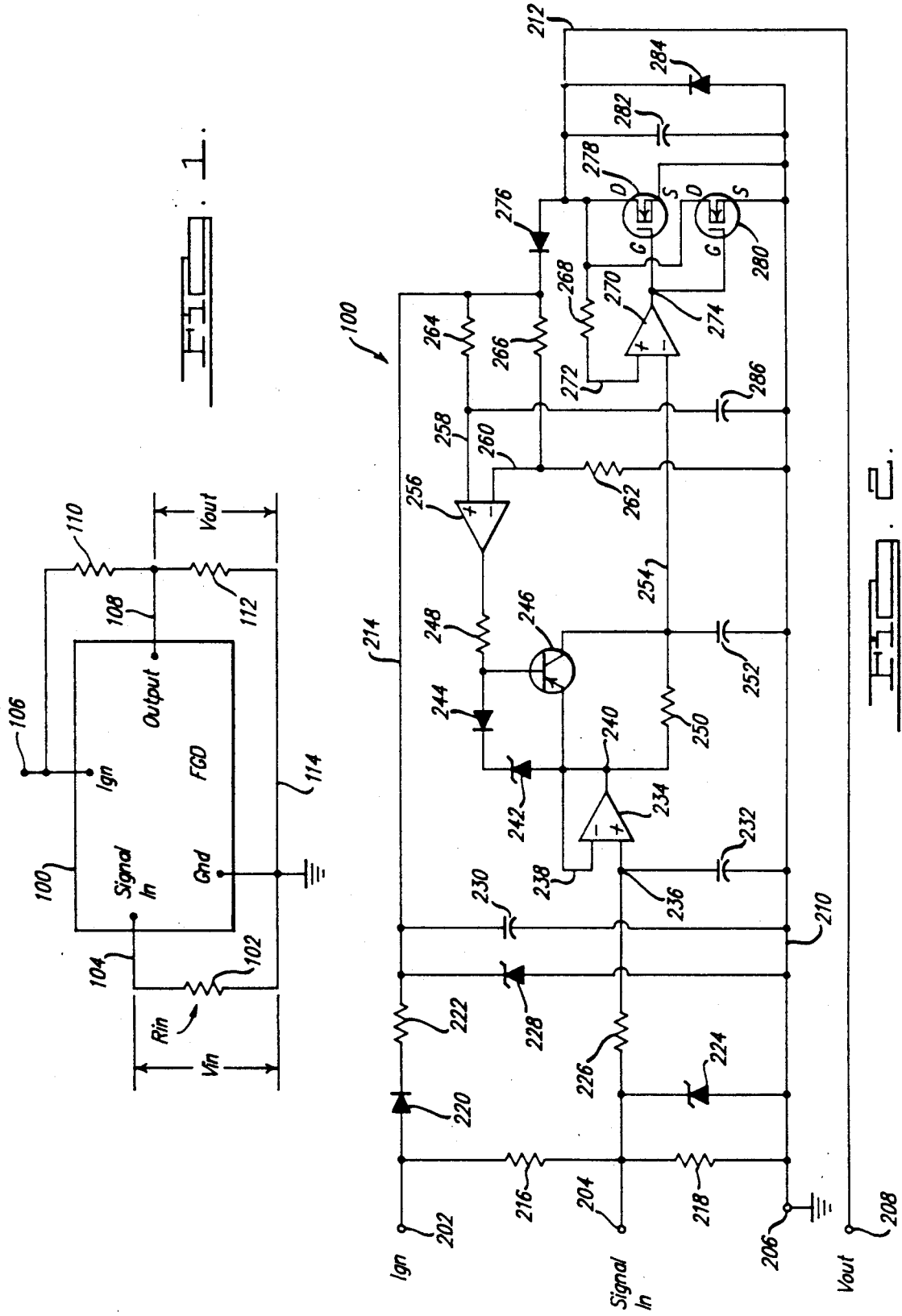

5,027,656

FUEL GAUGE DAMPER CIRCUIT WITH A RETURN TO ZERO GAUGE CIRCUIT

BACKGROUND OF THE INVENTION

This is a continuation-in-part of U.S. Ser. No. 07/364,914, filed June 12, 1989 now abandoned, which is a continuation of U.S. Ser. No. 07/144,217, filed Jan. 15, 1988 now U.S. Pat. No. 4,838,082 which is hereby expressly and specifically incorporated by reference.

The invention generally relates to circuitry for damping or averaging signal fluctuations driving a fuel gauge. More specifically, the invention concerns a damping circuit to be placed between the variable resistance output of a fuel tank sending circuit and the driving input to a fuel gauge.

In addition, an improvement to the invention relates to a return to zero feature which drives the gauge to zero after the ignition voltage is removed, i.e., turned off, thereby allowing the gauge to return to zero as the engine is turned off and begin operation from zero when the engine is once again turned on.

False fuel gauge indications in vehicles such as automobiles are often generated as a result of the vehicle's acceleration, going uphill or downhill, cornering or undergoing any other operation that causes the fuel to "slosh" about or otherwise vary in a highly transient manner. Known approaches to dealing with the "sloshing" problem appear to involve relatively complex arrangements such as utilization of microcomputers for averaging the analog level readings obtained from the tank sender circuit. Related known patents in this area are the following U.S. Pat. Nos.: 4,402,048; 4,497,205; 4,470,296; 4,250,750; 3,938,117; 3,727,182; 3,649,911; 3,638,115; and 2,356,617.

U.S. Pat. No. 4,402,048—Tsuchida et. al. discloses a microcomputer-based system for indicating fuel quantity wherein the limit values about a center reading are used to discriminate against abnormal sudden changes caused by sloshing.

U.S. Pat. No. 4,497,205—Zulauf et. al. discloses a liquid level sensor using a variable flux generating coil to indicate the level. The monitoring circuit includes a filter means which reduces the response of the circuit to transient indications caused by sloshing.

U.S. Pat. No. 4,470,296—Kobayashi et. al. discloses a fuel gauge wherein the fuel level signal is averaged over time intervals which vary according to whether the fuel level is "stable" or "unstable". When the fuel level is deemed unstable the averaging time interval is selected to be longer than that used when the fuel level is stable. Stability is determined by a variety of vehicle sensors, such as speed sensors.

U.S. Pat. No. 4,250,750—Martinec et. al. discloses a liquid level measuring system wherein a microprocessor drives a bar graph type display. The microprocessor program compares each sample to a last sample and does not alter the bar graph display output unless several consecutive samples indicate a need to alter the displayed gauge indication.

U.S. Pat. No. 3,727,182—Snyder teaches a dual sensor monitoring and signal warning circuit for indicating a low brake fluid level in either reservoir of a split master brake cylinder. A resistive-capacitive time delay prevents energization of a warning lamp to prevent flickering in the event of brake fluid sloshing.

U.S. Pat. No. 3,938,117—Bozoian, similar to the '182-Snyder Patent, concerns a critical liquid level warning circuit with delay interposed to prevent a false low fuel warning in the event of fuel sloshing.

U.S. Pat. No. 3,649,911—Swanson teaches a meter driver circuit for improving meter responsiveness. The invention is directed principally to a circuit for initially overdriving a meter to overcome friction and inertia of the meter movement.

U.S. Pat. No. 3,638,115—Grundy discloses a meter jitter minimizing circuit.

U.S. Pat. No. 2,356,617—Rich discloses circuitry for providing sudden capacitive current in-rush to speed the response of a meter movement.

There is a need for a relatively simple and economical circuit for damping undesirable variations in input signals from a fuel tank sending unit prior to sending the filtered indicator signals to a utilization device such as an air core magnetic fuel indicating gauge.

SUMMARY OF THE INVENTION

Accordingly, a fuel gauge damper circuit for supplying an indicator signal to a fuel gauge of a vehicle comprises a damper circuit input coupled for receipt of a signal from a fuel tank sender. A bias potential means coupled to a power supply of the vehicle generates a predetermined bias potential at an output thereof. A variable input voltage generating means is coupled to the damper circuit input and to the bias potential means and is operative to generate a damper circuit input voltage which varies proportionally to the fuel tank sender signal. A filtering means receives the variable input voltage and generates an indicator signal comprising a filtered time average of the variable input voltage for presentation to the fuel gauge of the vehicle.

If desired, the gauge may be returned to zero after ignition voltage is removed. This is accomplished by a minor circuit change to the fuel damper circuit and the addition of a battery feed. This is illustrated specifically in FIG. 3, FIG. 4 and FIG. 5. It is illustrated generically in FIG. 6.

BRIEF DESCRIPTION OF THE DRAWINGS

The objects and features of the invention will become apparent from a reading of a detailed description of a preferred embodiment taken in conjunction with the drawings, in which:

FIG. 1 is a functional block diagram setting forth the system connections for a damper circuit designed in accordance with the principles of the invention;

FIG. 2 is a circuit schematic diagram setting forth the details of the fuel gauge damper circuit of FIG. 1;

DETAILED DESCRIPTION

Figure 3:
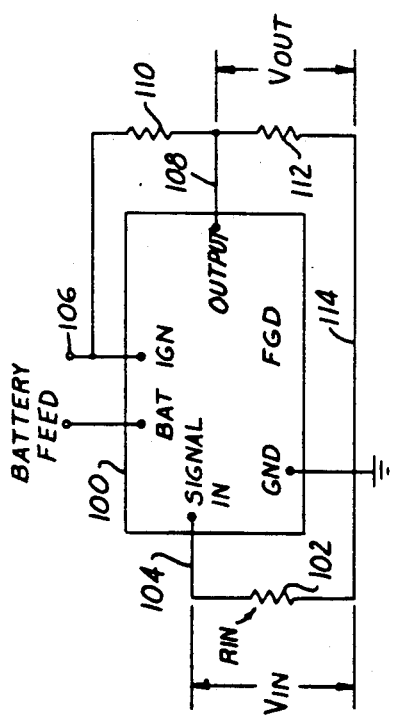
FIG. 3 is another view of FIG. 1 with the addition of the battery voltage shown in the fuel gauge damper circuit to modify the circuit for the return to zero feature.

As seen from FIG. 1, a fuel gauge damper 100 receives a resistive input signal from a fuel tank sending unit (not shown).

In general, the operation of a typical fuel tank sender involves a float that rides on the surface of the fuel and is therefore displaced upward or downward depending on the fuel level. The float is mechanically coupled to a sliding electrical contact which wipes over a stationary resistive element coupled between ground potential and the fuel tank sender output. Hence a variable resistance output is generated in accordance with the position of the float. This variable resistance 102, also designated as $R_{in}$, when combined with the input resistance of damper circuit 100 forms, in conjunction with the vehicle power supply presented at terminal 106 also designated IGN, an input voltage $V_{in}$. During vehicle acceleration, cornering and other maneuvers, fuel slosh inside the fuel tank may give rise to wide fluctuations in the sending unit output resistant signal which in turn causes large variations of $V_{in}$. The voltage available at the damper output 108 is a filtered average of the input voltage $V_{in}$. The output voltage is loaded as shown in FIG. 1 and is capable of sinking the quantity of current necessary to drive an output load such as a magnetic gauge.

Input resistance 102 is coupled between a ground supply at 114 and an input terminal 104. An input bias voltage derived from the vehicle's power system is presented to the damper circuit 100 at terminal 106, while an output terminal 108 is coupled to the junction of output loading resistors 110 and 112. A second terminal of resistor 110 is coupled to bias potential supply at terminal 106, while a second terminal of output resistor 112 is coupled to ground potential via path 114.

The details of the circuit arrangement for the fuel gauge damper 100 of FIG. 1 are set forth in the circuit schematic of FIG. 2. A resistive input signal from the fuel tank sender circuit is presented to the circuit of FIG. 2 across SIGNAL IN terminal 204 and ground terminal 206. Input resistor 218 is coupled between input terminal 204 and ground terminal 206, while input resistor 216 is coupled between terminal 202 coming from the ignition switch and input terminal 204. Coupled in parallel with input resistor 218 is a regulating zener diode 224. A bias reference potential for the circuit 100 is developed at lead 214 by means of diode 220 series connected with resistor 222 between the ignition at 202 and lead 214, along with a regulating zener diode 228 and filter capacitor 230 which are connected in parallel between bias output at 214 and ground potential at path 210.

An input buffer amplifier 234 is comprised, for example, of an operational amplifier type LM 2902, commercially available from a number of sources, such as Motorola, Inc. Buffer amplifier 234 has a non-inverting input 236 coupled to an input filter circuit comprising a resistor 226 having a first terminal coupled to input terminal 204 and a second terminal coupled to input 236 of amplifier 234. The filter circuit additionally includes capacitor 232 which is coupled between input 236 and ground potential at lead 210. An inverting input 238 of buffer amplifier 234 is coupled to the amplifier output 240.

Output 240 of input buffer amplifier 234 is coupled to a first terminal of resistor 250 which has a second terminal coupled to a first terminal of capacitor 252 and to an inverting input of an output amplifier 270 via path 254. The combination of resistor 250 and capacitor 252 forms a filtering or time delay RC network for the input voltage appearing at output 240 of buffer amplifier 234. The filtered signal across capacitor 252 is presented to the inverting input of operational amplifier 270, which may also be comprised of type LM 2902. Amplifier 270 additionally has a non-inverting input 272 coupled to a first terminal of a feedback resistor 268. The output 274 of amplifier 270 is commonly coupled to the gate electrodes of insulated gate field effect transistors 278 and 280. The drain electrodes of transistors 278 and 280 are commonly coupled to a second terminal of feedback resistor 268, while the source electrodes of transistors 278 and 280 are commonly coupled to ground potential at path 210. The drain electrodes of transistors 278 and 280 are additionally coupled to the output terminal 208 of the fuel gauge damper circuit.

Transient suppression and protection is provided at the output 208 of circuit 100 by capacitor 282 and diode 284 coupled in parallel between the output terminal 208 and ground at path 210. Capacitor 282 also helps prevent the output signal of amplifier 270 from going into oscillation. Additional output transient suppression is provided by diode 276 which has an anode electrode coupled to output 208 via path 212 and a cathode electrode coupled to the bias supply at path 214. Diode 276 therefore provides a path back to zener diode 228 and capacitor 230 in the presence of a potentially large voltage transient at path 212 to clamp any such transient to a safe level determined by zener diode 228.

An initialization circuit arrangement for the fuel gauge damper 100 of FIG. 2 is generally comprised of operational amplifier 256 (also of type LM 2902) and transistor 246, along with timing resistor 264 and timing capacitor 286. A non-inverting input 258 of amplifier 256 is coupled via resistor 264 to bias potential at path 214. Additionally, input 258 is coupled to ground at path 210 via initializing capacitor 286. A second terminal of resistor 264, which is coupled to bias supply voltage at 214, is additionally coupled to the cathode electrode of diode 276. Additionally, the cathode electrode of diode 276 is coupled to a first terminal of resistor 266. Resistor 266 has a second terminal coupled to an inverting input 260 of amplifier 256 and to a first terminal of resistor 262. A second terminal of resistor 262 is coupled to ground potential at path 210. Amplifier 256 has an output coupled to an output resistor 248 at one terminal thereof.

A second terminal of resistor 248 is coupled to a base electrode of PNP transistor 246. The base electrode of transistor 246 is coupled to an anode terminal of diode 244. The cathode electrode of diode 244 is coupled to a cathode electrode of zener diode 242, which has an anode electrode coupled to output 240 of input buffer amplifier 234, an emitter electrode of transistor 246 and input 238 of amplifier 234. The collector electrode of transistor 246 is coupled to line 254 and to one side of capacitor 252 and resistor 250.

During normal operation of the fuel gauge damper circuitry, after the ignition system has been running for some time, the operation of the circuit of FIG. 2 is as follows. A resistive input at terminal 204 will give rise to a voltage at terminal 204 equal to the input voltage which is proportional to the changing resistance presented by the fuel tank sender. The input voltage is based on the voltage available from the ignition system at terminal 202. Assuming there are no significant leakage or input bias currents associated with capacitor 232 or operational amplifier 234, the input voltage will also be present at points 236 and 240, the output of input buffer amplifier 234. After a time determined by the RC time constant established by resistor 250 and capacitor 252, capacitor 252 will be charged via resistor 250 to a value approximately equal to the input voltage appearing at terminal 240. The combination of operational amplifier 270 and transistors 278 and 280 form a unity gain voltage output amplifier with increased output current capability suitable for driving, for example, an air core magnetic fuel gauge.

If the input resistance changes with the change in resistive signal received from the fuel sending circuit, then the input voltage also will change. However, due to the relatively large time constant associated with resistor 250 and capacitor 252, the input voltage changes will not appear immediately at output terminal 208, but rather at some later time after capacitor 252 has had time to charge to the new level of input voltage. If the input resistance is constantly changing (and this is precisely the case for the output of a typical fuel sender unit) then resistor 250 and capacitor 252 essentially act as a large filter to smooth the input signal voltage variations. The resultant voltage at the output terminal 208 is then essentially a filtered time average of the input voltage.

When the vehicle ignition is first turned on, it is undesirable to delay the fuel gauge reading by the large time period introduced by the filter circuit of resistor 250 and capacitor 252. Therefore, on a power-up or ignition turn-on situation when the engine first begins to crank, circuitry is desired for altering the characteristics of the filter comprising resistor 250 and capacitor 252. This feature is provided in the following manner. At power-up, capacitor 286 is initially discharged and will immediately begin charging through resistor 264 when a bias potential at path 214 first appears, due to the turning on of the ignition switch. As long as the voltage at input 258 to amplifier 256 is lower than the voltage at input 260 to amplifier 256, then the output of operational amplifier 256 will assume a logic low state, thereby turning on transistor 246 such that a high conductivity or low impedance condition is presented across its emitter-collector terminals. In the high conductivity state, transistor switch 246 effectively shorts out or bypasses filter resistor 250 thereby enabling capacitor 252 to charge up substantially instantaneously to the input voltage appearing at buffer amplifier output 240. After a suitable delay period determined by the time constant associated with resistor 264 and capacitor 286 and the voltage at amplifier input 260 determined by resistors 262 and 266, capacitor 286 will charge to a level such that input 258 of amplifier 256 will be higher than the potential appearing at input 260 thereby forcing the output of operational amplifier 256 to a logic high condition, which, in turn, will place transistor 246 in the off state or high impedance condition between its emitter and collector terminals. Under these conditions, filter capacitor 252 will be charged through resistor 250 and the output voltage at terminal 208 will be a filtered average of the input voltage. The incorporation of the above described power-on or initialization circuitry eliminates erroneous gauge indications which would otherwise occur immediately following ignition switch turn on and vehicle cranking.

A return to zero feature can be added to the circuitry shown in FIG. 1 and FIG. 2 with a circuit change, an additional circuit and the addition of a battery feed. The addition of the battery feed to FIG. 1 is shown in FIG. 3 and the circuit change is shown in FIG. 4 by the deletion of the diode 220 from FIG. 2.

Figure 4:
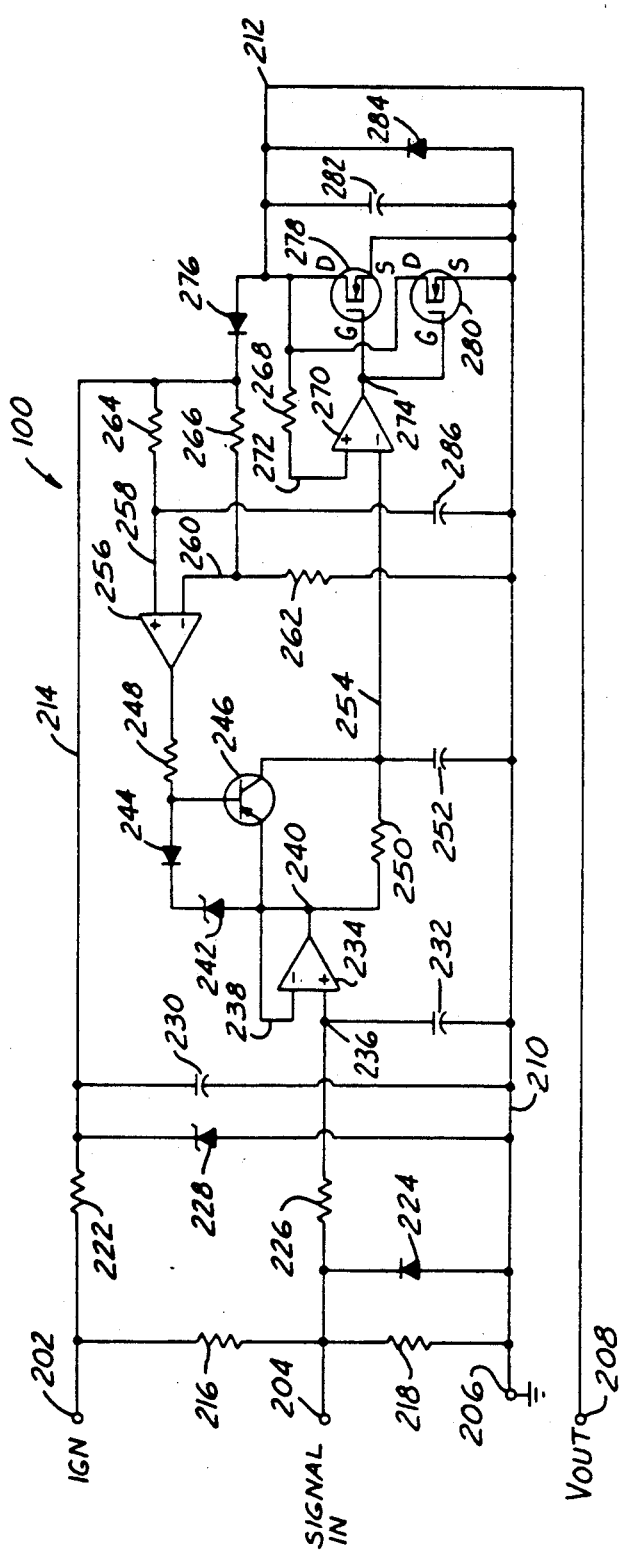
FIG. 4 is another view of FIG. 2 with the deletion of diode 220 from the fuel gauge damper circuit to modify the circuit for the return to zero feature.
Figure 5:
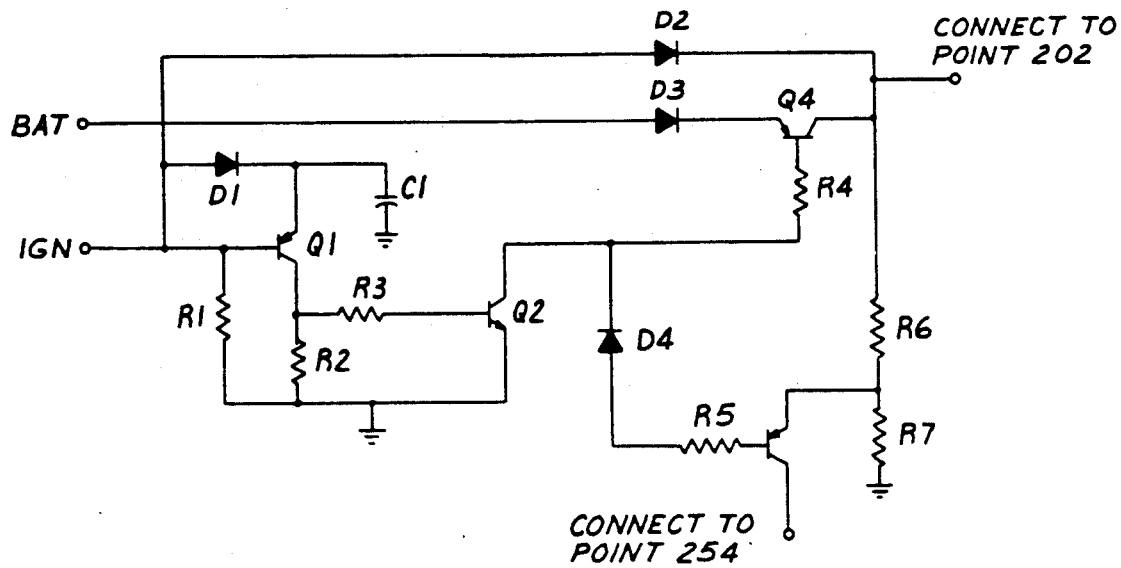
FIG. 5 is a schematic diagram illustrating the additional circuitry needed to interface with the circuitry in FIG. 3 and FIG. 4 for the return to zero feature.

The Additional circuit shown in FIG. 5 is connected as illustrated to specific points in the circuitry of FIG. 3 and FIG. 4.

Refer to FIG. 5 for the following explanation of the circuit operation.

When ignition is turned on it causes capacitor C1 to become charged up to ignition. In this state Q1 is off Q2 is off and Q4 is off this allows gauge power to be taken directly from ignition through D2.

Upon removal of ignition voltage the base of Q1 goes low which turns on Q1 allowing C1 to discharge through R2. This turns on Q2 which turns on Q4 and Q3. Power to the gauge and the damper module is then supplied from battery through Q4. The voltage at the emitter of Q3 is transferred to the output through the final stage of the damper module. This voltage represents what is required for the gauge to be driven to zero. Once this voltage is transferred to the output the gauge immediately begins to go to zero.

After a length of time set up by C1 and R2, transistor Q1 is turned off which turns off Q2, Q4, and Q3. This turns off all power to the gauges and the rest of the circuit so that the battery will not be drained with ignition off.

It is important to note that this circuit could be used to drive any type of gauge that requires a voltage or resistive input. The circuit can be adjusted to provide whatever amount of dampening is required while returning all gauges to zero at the same fast rate.

Figure 6:
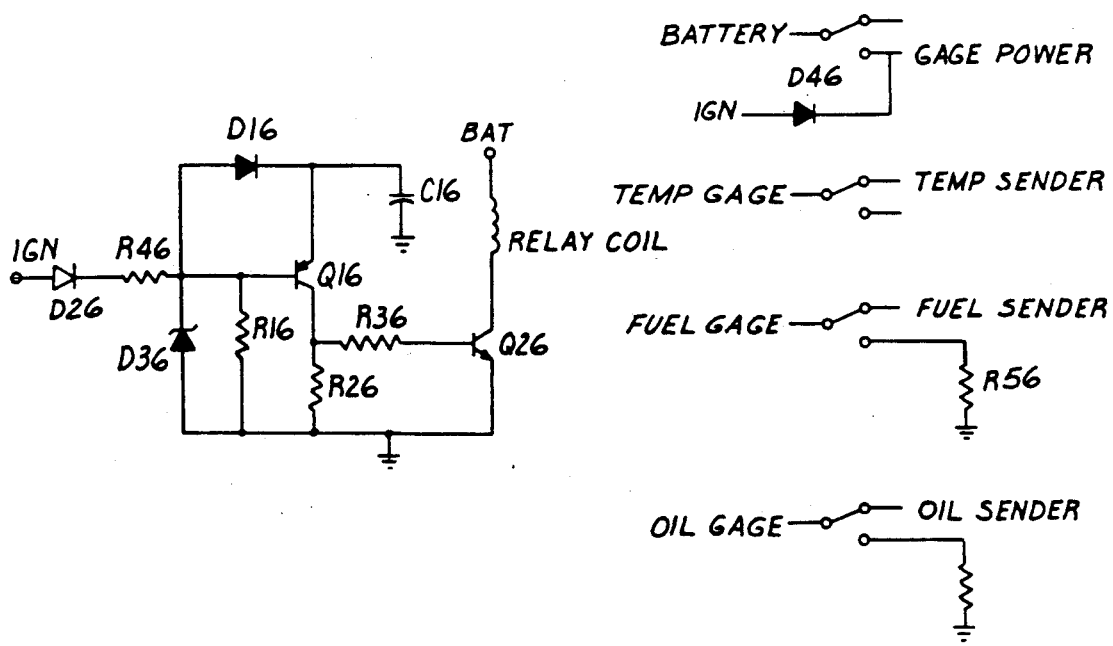
FIG. 6 is a schematic diagram illustrating the return to zero circuit for any gauge application.

For the following circuit explanation refer to FIG. 6.

When ignition is first applied C16 begins to charge up to ignition through R46, D16 and D26. Q16 and Q26 are off which leaves the relay coil in the non energized state. This leaves all contacts in their normal state which leaves the normal sender input to the gauges.

When ignition voltage is removed the base of transistor Q16 is at ground potential and the voltage at the emitter is high due to the charge held by C16. This causes Q16 to turn on and allows C16 to discharge through R26 and provide bias current through R26 to Q26 which is a very high gain darlington transistor. This causes Q26 to provide ground to the relay coil which energizes the relay.

The relay switches the gauge power to battery allowing the gauges to be energized with ignition off. The relay also switches the input to the gauge from their normal input to the load or voltage required to drive them to empty. In FIG. 6 the load for temp gauge is open circuit for the fuel and oil gauge the load required is 90 ohms.

After C16 discharges Q16 turns off which turns off Q26 which turns off the relay coil. This returns power to the gauges to ignition and returns all inputs to the gauges to the normal state.

D46 prevents battery voltage from bleeding into ignition when the relay is energized. D36 is required for transient protection. D16 and D26 prevent C16 from discharging any where except through Q16 and R16.

The invention has been described in connection with a detailed description of a preferred embodiment. The details of the description are for the sake of example only and the invention is to be interpreted in scope and spirit in accordance with the appended claims.

What is claimed is:

1. A fuel gauge damper circuit for supplying an indicator signal to a fuel gauge of a vehicle comprising:
   a damper circuit input coupled for receipt of a variable resistance signal from a fuel tank sender;

bias potential means coupled to an ignition switch of the vehicle for receipt of power from a vehicle power supply whenever the ignition switch is placed in a predetermined position, the bias potential means operative to generate the predetermined bias potential level at its output;

a resistive input circuit coupled to the ignition switch and the damper circuit input, operative to generate at its output a damper circuit input voltage varying proportionally with the variable resistance fuel tank sender signal;

filter means including a charging resistor having a first terminal coupled to the output of the resistive input circuit, and a charging capacitor coupled between a second terminal of the charging resistor and ground potential, the filtering means operative to generate the indicator signal across the charging capacitor; and initializing means comprising:
an initializing resistor with a first terminal coupled to the bias potential means output;
an initializing capacitor having a first terminal coupled to a second terminal of the initializing resistor and a second terminal, coupled to ground potential;
first and second series-coupled bias resistors coupled between the bias potential means output and ground potential;
an operational amplifier comparator having a first input coupled to the first terminal of the initializing capacitor and a second input coupled to the junction of the first and second bias resistors; and
a transistor switch having a base electrode coupled to an output of the operational amplifier comparator, and an emitter electrode coupled to the first terminal of the charging resistor and a collector electrode coupled to the second terminal of the charging resistor; and a return to zero circuit for driving the gauge to zero after the ignition voltage is removed comprising:
a capacitor which is charged toward the ignition voltage when the ignition switch is applied;
a first transistor connected to the capacitor such that the first transistor changes state when the ignition voltage is removed, allowing the capacitor to discharge through the first transistor;
a second transistor coupled to the first transistor, whereby the second transistor changes State when the capacitor discharges through the first transistor;
a relay coil connected between the second transistor and battery voltage such that the relay coil changes state when the second transistor changes state;
the relay coil being coupled to the gauge power such that when the ignition voltage is removed, the relay coil switches the gauge power to the battery voltage allowing the gauges to be energized with the ignition voltage removed;
a load required to drive the gauge to zero;
the relay coil coupled to the load such that when the ignition voltage is removed, the relay coil switches the gauge to the load, thereby driving the gauge to zero.

2. A fuel gauge damper circuit for supplying an indicator signal to a fuel gauge of a vehicle comprising:
a damper circuit input coupled for receipt of a variable resistance signal from a fuel tank sender;
bias potential means coupled to an ignition switch of the vehicle for receipt of power from a vehicle power supply whenever the ignition switch is placed in a predetermined position, the bias potential means operative to generate the predetermined bias potential level at its output;
a resistive input circuit coupled to the ignition switch and the damper circuit input, operative to generate at its output a damper circuit input voltage varying proportionally with the variable resistance fuel tank sender signal;
filter means including a charging resistor having a first terminal coupled to the output of the resistive input circuit, and a charging capacitor coupled between a second terminal of the charging resistor and ground potential, the filtering means operative to generate the indicator signal across the charging capacitor;
an output buffer amplifier having an input coupled to the second terminal of the charging resistor and a output coupled to an output of the fuel gauge damper circuit for carrying the indicator signal;
wherein the output buffer amplifier comprises an operational amplifier having a first input coupled to the output of the input buffer amplifier and a second input coupled by a feedback resistor to the output of the output buffer amplifier, and first and second field effect transistors with gate electrodes of the first and second transistors commonly coupled to an output of the operational amplifier, drain electrodes of the first and second transistors commonly coupled to the input of the operational amplifier and source electrodes of the first and second transistors commonly coupled to ground potential;
a return to zero circuit for driving the gauge to zero after the ignition voltage is removed comprising:
a capacitor which is charged toward the ignition voltage when the ignition switch is applied;
a first transistor connected to the capacitor such that the first transistor changes state when the ignition voltage is removed, allowing the capacitor to discharge through the first transistor;
a second transistor coupled to the first transistor, whereby the second transistor charges State when the capacitor discharges through the first transistor;
a relay coil connected between the second transistor and battery voltage such that the relay coil changes state when the second transistor changes state;
the relay coil being coupled to the gauge power such that when the ignition voltage is removed, the relay coil switches the gauge power to the battery voltage allowing the gauges to be energized with the ignition voltage removed;
a load required to drive the gauge to zero;
the relay coil coupled to the load such that when the ignition voltage is removed, the relay coil switches the gauge to the load, thereby driving the gauge to zero.

* * * * *